(12) United States Patent
Hutzler

(10) Patent No.: US 6,457,400 B1
(45) Date of Patent: Oct. 1, 2002

(54) BASTER

(75) Inventor: Lawrence R. Hutzler, Lakeville, CT (US)

(73) Assignee: Hutzler Manufacturing Co., Inc., Canaan, CT (US)

( * ) Notice: Subject to any disclaimer, the term of this patent is extended or adjusted under 35 U.S.C. 154(b) by 0 days.

(21) Appl. No.: 09/759,824

(22) Filed: Jan. 11, 2001

(51) Int. Cl.[7] .............................................. A47J 37/10
(52) U.S. Cl. ............................ 99/345; 99/494; 99/532; 141/26; 141/357
(58) Field of Search ........................ 99/345, 494, 532, 99/533; 141/26, 25, 21, 352, 357; 222/209, 213, 215

(56) References Cited

U.S. PATENT DOCUMENTS

| | | | | |
|---|---|---|---|---|
| 1,192,596 A | * | 7/1916 | Albrecht ...................... 99/532 |
| 3,754,469 A | * | 8/1973 | Gasior ........................ 99/532 |
| 4,254,700 A | * | 3/1981 | Fleming ........................ 9/532 |
| 5,408,919 A | | 4/1995 | Hutzler ........................ 99/345 |
| 5,638,872 A | * | 6/1997 | Porter .......................... 141/26 |

* cited by examiner

Primary Examiner—Reginald L. Alexander
(74) Attorney, Agent, or Firm—Michael J. Striker

(57) ABSTRACT

A baster, comprising a cylinder; a unit for sucking a substance into the cylinder and then expelling it from the cylinder into an object to be cooked; a removable injecting element connectable with the cylinder and having a front part insertable into an object; so that when said injecting element is attached to the cylinder the injecting element can be inserted into an object and the substance can be injected into an interior of the object through the injecting element, and when the injecting element is removed from the cylinder the substance can be expelled directly from the cylinder and placed on an exterior of the object.

8 Claims, 1 Drawing Sheet

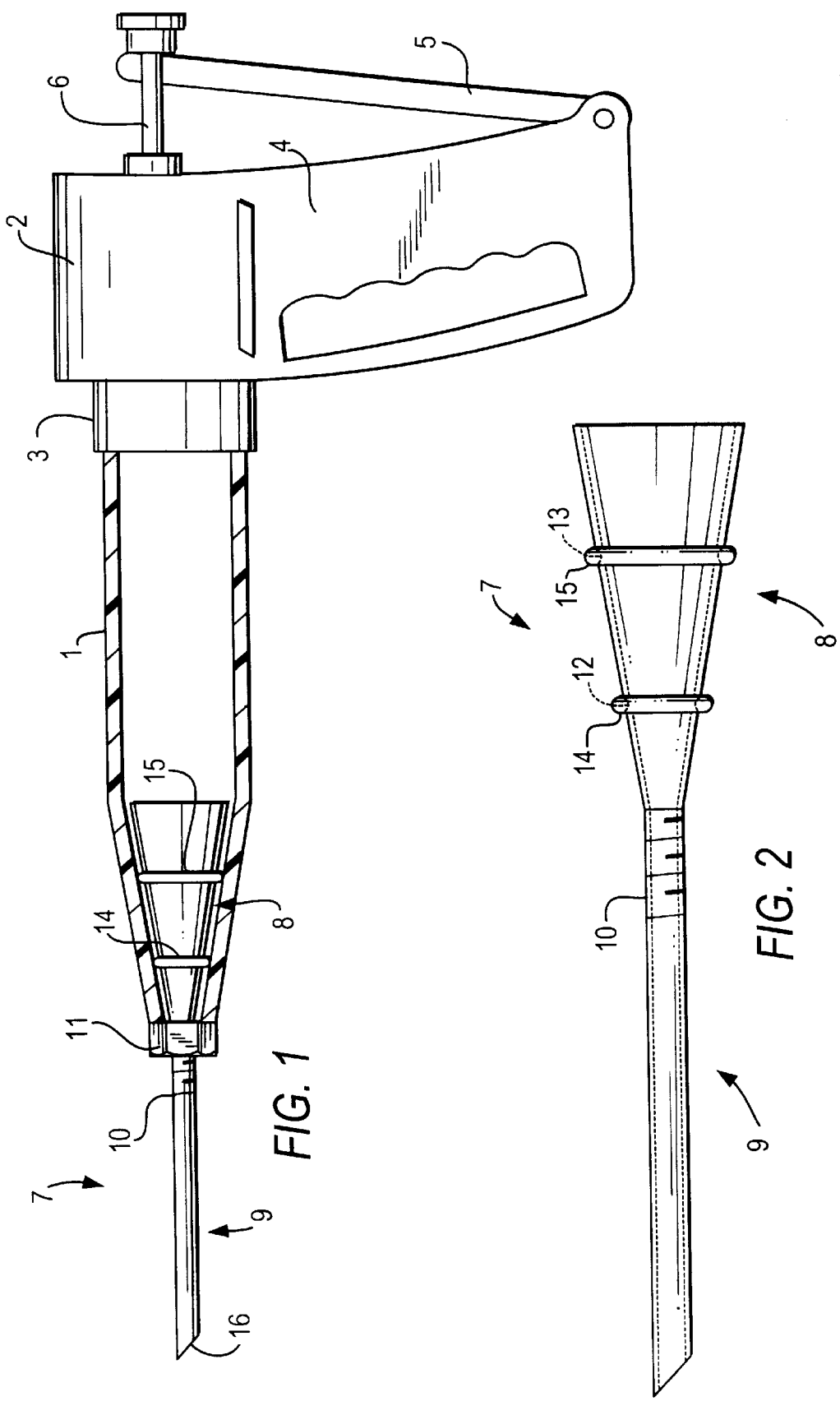

BASTER

BACKGROUND OF THE INVENTION

The present invention relates generally to basters.

Basters to be used in cooking are well known. A known baster sucks a substance into a receptacle and then expels it from the receptacle and injects it an object to be cooked. The above described baster is disclosed in my U.S. Pat. No. 5,408, 219. It is believed that this baster can be further improved.

SUMMARY OF THE INVENTION

Accordingly, it is an object of the present invention to provide a baster which is a further improvement of the existing basters.

In keeping with these objects and with others which will become apparent hereinafter, one feature of present invention resides, briefly stated, in a baster which has a cylinder or a barrel, means for sucking a substance into the cylinder and thereafter expelling the substance from said cylinder into an object, and a removable injecting element which is removably connected with a front end of said cylinder and includes a rear part which is insertable in said cylinder, and a front part which extends outwardly beyond said cylinder and has a substantially narrow front end, and means for removably attaching said injecting element to said cylinder so that when said injecting element is attached to said cylinder said injecting element can be inserted into an object and the substance can be injected into an interior of the object through said injecting element, and when said injecting element is removed from said. cylinder the substance can be expelled directly from said cylinder and placed on an exterior of the object.

When the baster is designed in accordance with the present invention, it provides for a possibility to introduce the injecting element into an object at any place, into any depth, accurately into a spot in which the substance has to be delivered in the interior of the object. On the other hand, without the injecting element the substance is delivered onto the surface of the objects.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a view showing a baster in accordance with the present invention; and

FIG. 2 is a view showing an injecting element of the inventive baster.

DESCRIPTION OF THE PREFERRED EMBODIMENTS

A baster in accordance with the present invention has a cylinder which is identified as a whole with reference numeral 1. The cylinder 1 has is removably attachable to a body which is identified as reference numeral 2 and accommodates a pumping means for sucking a substance into the cylinder 1 and then expelling the substance from the cylinder 1 into an object. The pumping means can be of conventional design, such as disclosed in my U.S. Pat. No. 5,408, 919 which is incorporated here as a reference. The. body 2 has a front projection 3 in which a rear portion of the cylinder 1 is insertable, for example by tightly fitting onto it. The body 2 also has a handle 4 which is to be held by a user of the baster, and a movable handle 5 which is connected with a piston rod 6 of a piston. By moving the handle portion 5 relative to the station in handle 4, the piston reciprocates in a chamber of the body 2 to suck the substance into the cylinder 1, and thereafter to expel it from the cylinder.

In accordance with the present invention, the baster is provided with an injecting element which is identified as a whole with reference numeral 7. The injecting element 7 has a rear part 8 and a front part 9. The rear part 8 and the front part 9 can be connected with one another, for example of one piece and made of plastic, for example by injection molding. As can be seen from the drawings, the rear part 8 is substantially conical, and its outer contour substantially corresponds to the inner contour of a conical front part of the cylinder 1. The front part 9 of the injecting element 7 is substantially cylindrical. The injecting element 7 is hollow and has a central passage which communicates with an interior of the cylinder 1.

Means are provided for connecting the injecting element 7 to the cylinder 1. The connecting means include for example a thread 10 provided on an outer surface of the injecting element 7, and a nut 11 which is screwable on the thread 10, as will be explained herein below. The injecting element 7 further provided with sealing means for sealing the injecting element 7 relative to the cylinder 1. The sealing means include two grooves 12 and 13 which are provided on the conical rear part 8 of the injecting element and are spaced from one another in an axial direction. The grooves 12 and 13 have different diameters. Sealing elements 14 and 15 are inserted in the grooves 12 and 13 so that they extend radially outwardly beyond the outer surface of the rear part 8 of the injecting element 7.

The front end 16 of the injecting element 7 is substantially narrow and can be also sharp. In particular, it can be cut off at an angle relative to the axis of the injecting element so as to provide a sharp tip for piercing the object to be injected.

In order to assemble the injecting element 7 with the cylinder 1 of the baster, the cylinder 1 is removed from. the front projection 3 of the body 2 of the baster, the injecting element 7 is introduced into the cylinder 1 from the right end of the cylinder as considered in the drawing and pushed to the left, until the conical rear part 8 of the injecting element 7 is introduced into the conical front part of the cylinder 1 and the seals 14 and 15 abut against the inner surface of the front part of the cylinder 1. Then, the nut 11 is screwed on the thread 10 until it abuts against the front end of the front portion of the cylinder 1. The injecting element 7 is therefore tightly connected with the cylinder 1. Then for operation of the baster, by acting on the handle 5 and therefore on the piston rod 6, the piston is pulled to the right and the substance is introduced into the cylinder 1 through the injecting element 7. Thereafter, by moving the handle 5 toward the handle 4 the piston is moved forwardly, and the substance is expelled from the cylinder 1 through the injecting element 7 into the object.

The inventive baster can operate in accordance with two different modes. When it suffices to place a substance on an exterior surface of an object, the injecting element 7 can be removed and the substance is expelled directly out of the cylinder 1 onto the object. When, however it is necessary to introduce the substance into an interior of the object, the injecting element 7 is attached to the cylinder 1, the injecting element with its narrow, sharp tip 16 is inserted into the object, and the substance is injected through the injecting element into the interior of the object.

It will be understood that each of the elements described above, or two or more together, may also find a useful application in other types of constructions differing from the types described above.

While the invention has been illustrated and described as embodied in baster, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. A baster, comprising a cylinder, means for sucking a substance into said cylinder and then expelling it from said cylinder into an object to be cooked; a removable injecting element connectable with said cylinder and having a front part insertable into an object; and means for connecting said injecting element with said cylinder so that when said injecting element is attached to said cylinder said injecting element can be inserted into an object and the substance can be injected into an interior of the object through said injecting element, and when said injecting element is removed from said cylinder the substance can be expelled directly from said cylinder and placed on an exterior of the object, said connecting means being provided on said front portion of said injecting element.

2. A baster as defined in claim 1, wherein said front part of said injecting element has a narrow front end.

3. A baster as defined in claim 1, wherein said injecting element also has a rear part which is connected with said front part.

4. A baster as defined in claim 3, wherein said rear part and front part are formed as one piece plastic element.

5. A baster as defined in claim 1, wherein said means for connecting said injecting element with said cylinder include a thread provided on said injecting element and a nut screwable on said thread.

6. A baster as defined in claim 3, wherein said rear part of said injecting element is substantially conical in correspondence with a conical front portion of said cylinder.

7. A baster as defined in claim 3, and further comprising sealing means provided on said rear part of said injecting element.

8. A baster as defined in claim 7, wherein said sealing means includes two grooves provided on said rear part of said injecting element, and two seals insertable in said grooves at axially spaced locations and radially projecting outwardly beyond an outer surface of said rear part of said injecting element.

\* \* \* \* \*